Jan. 9, 1962  L. SZÉKELY  3,015,968
CONTROL MECHANISM FOR GEAR BOXES OF MOTOR VEHICLES
Filed Jan. 20, 1959  2 Sheets-Sheet 1

INVENTOR.
LÁSZLO SZÉKELY
BY Irwin S. Thompson
ATTY.

Jan. 9, 1962     L. SZÉKELY     3,015,968
CONTROL MECHANISM FOR GEAR BOXES OF MOTOR VEHICLES
Filed Jan. 20, 1959     2 Sheets-Sheet 2

INVENTOR.
LÁSZLÓ SZÉKELY
BY
Irvin S. Thompson
ATTY.

united States Patent Office 3,015,968
Patented Jan. 9, 1962

3,015,968
CONTROL MECHANISM FOR GEAR BOXES
OF MOTOR VEHICLES
László Székely, Budapest, Hungary, assignor to Jarmufejlesztesi Intezet, Budapest, Hungary, a firm
Filed Jan. 20, 1959, Ser. No. 788,012
Claims priority, application Hungary Jan. 27, 1958
4 Claims. (Cl. 74—477)

Most of the motor vehicles (motor cars, tractors and other road vehicles as well as locomotives) use a gear drive for transmitting the power of the combustion engine to the wheels. The selection of the desired gear ratio is effected by means of shifting the gears, or, if the gears are in constant mesh, by means of clutches. In both cases fork-shaped control elements are used, which are actuated by shiftable selector bars, or they are guided on stationary selector bars.

The systems using shiftable selector bars have the drawback that in the casing of the control device long bores are necessary, which ought to be machined with very exact dimensions and with a high finish. In the systems using stationary selector bars on which the selector forks are moving, such bores are not necessary, but complicated locking devices must be used, which often lead to breakdowns.

The present invention is suitable to eliminate all these disadvantages. The invention relates to a control mechanism for gear boxes of motor vehicles, which mechanism is in fact a combination of the known shiftable bar type and the stationary bar type. The basic idea of the invention is that the selector forks are situated on a common bar or a common group of bars, so that only one bar should be fitted, but for this purpose a bore is not by all means necessary. A further advantage of the invention is that an independent or separate locking device is not necessary, because the stationary and the shiftable bars are situated in a common space, which has advantageously a cylindrical cross section. This space is formed by the coaxial bores of the hubs of the selector forks.

One of the bars is made stationary in respect of the casing of the gear box, but each of the other bars are coupled to a selecting fork, or these bars form a part of the forks, and they may be shifted in respect to one another and to the stationary selecting bar. If one of the bars is shifted, the other bars are directly locked.

The other details of the invention are explained in connection with the enclosed drawing, diagrammatically showing two embodiments of the invention by way of example.

Figure 1:
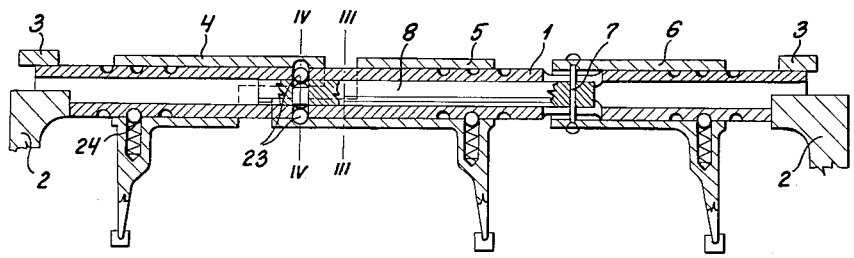
FIG. 1 is a longitudinal section of a control mechanism for change gear devices provided with three forks and suitable to produce six speeds.

With reference to FIG. 1 of the drawing, the stationary part is formed of a pipe 1 having a circular cross section and fastened to the casing 2 of the gear box by means of locking elements 3. At the end of the hubs 4 and 5 of the shiftable forks are cut-out parts enabling a positioning of these forks in such a way that they overlap each other.

Figure 4:
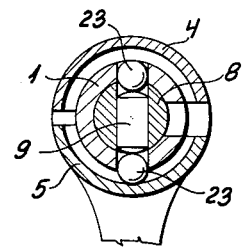

At the end of the bar 8 opposite to the hub 6 there is a locking device well known in itself. This locking device consists of a circular groove in the bar, a bore in this groove, a short pin 9 in the bore and two balls 23 at the ends of the bore within the said groove. In the hubs 4 and 5 of the forks depressions are machined corresponding to the balls 23. In the position shown in FIGS. 1 and 4 hub 5 is locked by one of the balls, if this hub is shifted, the two balls are pressed to their other extreme position and they lock the hub 4, and finally if the bar 8 is shifted, both balls are pressed outwardly and they lock both hubs.

For shifting the bar 8 its right hand end is connected to the hub 6 by means of a rivet 7.

By means of this locking device at the shifting of one of the movable elements the two other movable elements are coupled to the stationary casing 2 by means of the balls 23. Thus, all of the necessary lockings are produced by the said single device.

Figure 3:
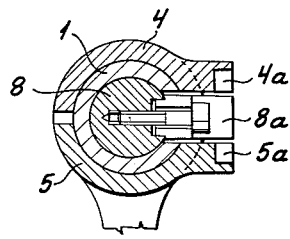
FIGS. 3 and 4 are cross sections along the lines marked I and II in FIG. 1.

FIG. 3 shows that on the hubs 4 and 5 of the forks projections 4a and 5a are made for making possible a shifting of them when the gear is changed. An extension 8a is screwed to the rod 8 and the said extension protrudes through an opening of pipe 1 between the projections 4a and 5a. In such a way the hubs 4 and 5 of the forks may be shifted directly and the hub of the fork 6 can be shifted by means of the rod 8 in an axial direction.

Figure 1A:
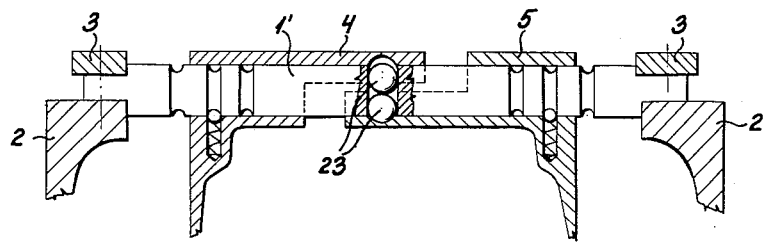
FIG. 1a shows the longitudinal section of a control mechanism for a gear box having four speeds.
Figure 2:
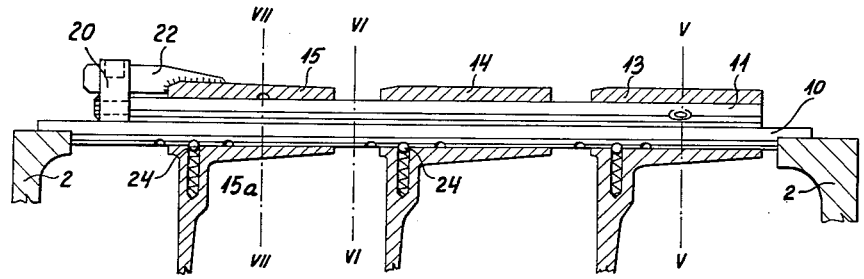
FIG. 2 is the longitudinal section of another form of the invention having also six speeds and three forks.
Figure 6:
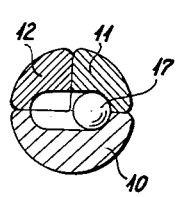
FIGS. 5 to 7 are cross sections along the lines marked with the numbers III to V respectively.

In gear boxes having four speeds only, the construction is simpler, because the parts 6, 7, 8 and 8a, and in most cases the part 9 too, may be dispensed with and instead of the pipe 1 a solid rod may be used (see FIG. 1a).

In the embodiment according to FIGS. 2 and 5 to 7 the stationary rod 10 has a semicircular cross section. Juxtaposed to this rod are two further rods 11 and 12, the cross section of which has the shape of a quarter of a circle. Thus, the three rods form together a complete circular bar, which is imprisoned in the hubs of the forks 13, 14 and 15.

Figure 5:
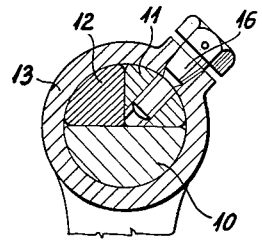
Figure 7:
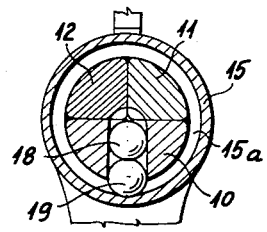
Figure 8:
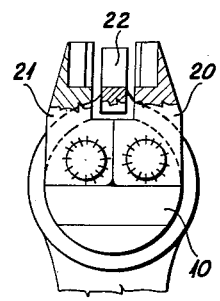
FIG. 8 is an end view of the mechanism as seen from left of FIG. 2.

According to FIG. 5 the bar 11 is fastened to the hub 13 by means of a screw 16 and the hub 14 is provided with a similar screw fixing it to the bar 12. The hub 15 may be moved independently of the bars.

When the hub 13 or the hub 13 is shifted, the hub 15 remains unmovable by means of balls 18 and 19 (FIG. 7), because the lower half of ball 19 is pressed in a circular groove 15a of the hub 15 and the upper half of this ball is in the radial bore of the fixed bar 10.

During the shifting movement of hub 15 the shiftable elements 11 and 12 are fastened to each other and to the unmovable rod 10 by means of ball 18 actuated by ball 19.

In this second embodiment of the invention it is possible to give a very advantageous shape to the control elements, and it is further possible to arrange the locking device at the one end of the bars.

The bars 11 and 12 are moved by projections 20 and 21 receiving the selecting elements, and the hub 15 is moved by means of a projection 22.

The balls 24 (FIG. 1) are used for fixing the hubs in the desired shifting positions as well known per se.

I claim:

1. In a control mechanism for a gear box having six speeds for motor vehicles enclosed within a casing comprising three selecting forks provided with hubs having coaxial inner surfaces, a group of three rods arranged to have a common cross section enabling said selecting forks to move thereon, one of said rods secured to said casing, two of said forks secured to said other rods to be moved thereby, said other fork adapted to be moved directly, and means actuated by one of said moving forks adapted to secure the other said forks to said secured rod.

2. A mechanism according to claim 1 in which the cross sections of two rods are equal, and the cross section of said other rod is equal to said two rods.

3. A mechanism according to claim 2 in which said rods form together a complete circular bar.

4. A mechanism according to claim 1 in which said means comprises balls vertically movable in a bore in said secured rod cooperating with depressions in said other rods.

References Cited in the file of this patent
UNITED STATES PATENTS

| | | |
|---|---|---|
| 2,118,090 | Kurti et al. | May 24, 1938 |
| 2,762,236 | Adloff | Sept. 11, 1956 |

FOREIGN PATENTS

| | | |
|---|---|---|
| 952,600 | Germany | Nov. 15, 1956 |